(12) United States Patent
Morgner

(10) Patent No.: US 11,878,870 B2
(45) Date of Patent: Jan. 23, 2024

(54) CONVEYING UNIT OF A TEXTILE MACHINE FOR CONVEYING TEXTILE MATERIAL

(71) Applicant: TEMAFA Maschinenfabrik GmbH, Bergisch Gladbach (DE)

(72) Inventor: Joerg Morgner, Kuerten (DE)

(73) Assignee: TEMAFA Maschinenfabrik GmbH, Bergisch Gladbach (DE)

( * ) Notice: Subject to any disclaimer, the term of this patent is extended or adjusted under 35 U.S.C. 154(b) by 19 days.

(21) Appl. No.: 17/704,468

(22) Filed: Mar. 25, 2022

(65) Prior Publication Data
US 2022/0306394 A1 Sep. 29, 2022

(30) Foreign Application Priority Data
Mar. 26, 2021 (DE) ...................... 10 2021 107 722.2

(51) Int. Cl.
*B65G 21/22* (2006.01)
*B65G 21/20* (2006.01)
*B65G 15/44* (2006.01)
*B65G 15/08* (2006.01)

(52) U.S. Cl.
CPC ............ *B65G 21/22* (2013.01); *B65G 15/08* (2013.01); *B65G 15/44* (2013.01); *B65G 21/2081* (2013.01)

(58) Field of Classification Search
CPC .... B65G 21/2072; B65G 21/22; B65G 15/08; B65G 15/44; B65G 21/2081; B65G 2201/0229; B65G 15/42
See application file for complete search history.

(56) References Cited

U.S. PATENT DOCUMENTS

| 4,321,996 | A | | 3/1982 | Sancken et al. |
| 4,887,539 | A | * | 12/1989 | Magaldi ................. B65G 17/42 110/165 R |
| 7,673,741 | B2 | * | 3/2010 | Nemedi ................. B65G 15/42 198/836.2 |

(Continued)

FOREIGN PATENT DOCUMENTS

| DE | 885 073 B | 8/1953 |
| DE | 10 29 732 A | 5/1958 |

(Continued)

OTHER PUBLICATIONS

EPO Search Report, dated Jul. 20, 2022.
German Search Report, dated Jan. 26, 2022.

*Primary Examiner* — Mark A Deuble
(74) *Attorney, Agent, or Firm* — Dority & Manning, P.A.

(57) ABSTRACT

A conveying unit of a textile machine has an endless circulating and drivable conveying element, the conveying element having a conveying area on an outer side thereof to receive and convey textile material. Opposite side walls are disposed to hold the textile material in the conveying area in a transverse direction of the conveying element. A sealing device is arranged between each of the side walls and the conveying element such that an interior space enclosed by the conveying element is at least partially sealed with respect to the textile material. The sealing device includes a sealing element connected to the conveying element so as to extend transversely away from and above the outer side of the conveying element.

17 Claims, 8 Drawing Sheets

(56) References Cited

U.S. PATENT DOCUMENTS

| | | | |
|---|---|---|---|
| 9,187,251 B2 * | 11/2015 | Thomczyk | ............ B65G 15/56 |
| 2015/0184852 A1 | 7/2015 | Magaldi | |
| 2021/0047125 A1 | 2/2021 | Geysen | |
| 2022/0306390 A1 * | 9/2022 | Haugen | ................ B65G 15/56 |

FOREIGN PATENT DOCUMENTS

| | | | |
|---|---|---|---|
| DE | 33 20 798 A1 | 12/1984 | |
| DE | 299 18 166 U1 | 2/2000 | |
| DE | 10 2004 048 222 A1 | 4/2006 | |
| EP | 0252967 A * | 7/1987 | ............ B65G 15/54 |
| JP | H 0437116 U | 3/1992 | |
| JP | 3578256 B2 | 10/2004 | |
| WO | WO-8704231 A * | 7/1987 | ............ B65G 15/54 |

* cited by examiner

CONVEYING UNIT OF A TEXTILE MACHINE FOR CONVEYING TEXTILE MATERIAL

FIELD OF THE INVENTION

The present invention relates to a conveying unit of a textile machine for conveying textile material, having an endlessly circulating and drivable conveying element, which has, on its outer side, a conveying area for conveying the textile material, having two side walls in order to hold the textile material in the conveying area in the transverse direction of the conveying element, and having two sealing devices, each of which is arranged between one of the two side walls and the conveying element such that an interior space enclosed by the conveying element is sealed with respect to the textile material.

BACKGROUND

DE 10 2004 048 222 A1 describes a conveyor belt for transporting a fiber material. A problem associated with this conveyor belt is that the seal between the textile machine and the deflection pulleys is insufficient.

SUMMARY OF THE INVENTION

A problem addressed by the present invention is therefore that of improving upon the related art. Additional objects and advantages of the invention will be set forth in part in the following description, or may be obvious from the description, or may be learned through practice of the invention.

The problem is solved by a conveying unit having the features described and claimed herein.

The invention provides a conveying unit of a textile machine for conveying textile material. Textile materials can also be textile fibers, which can be short and/or long fibers. The textile fibers can also be natural fibers, plant fibers, and/or synthetic fibers.

The conveying unit includes an endlessly circulating and drivable conveying element, which has, on its outer side, a conveying area for conveying the textile material. The textile material is conveyed in the conveying area. The conveying element can also have, additionally or alternatively, a support area on its outer side, on which the textile material rests. The conveying area can also be the support area. Due to the fact that the conveying element is designed to be endlessly circulating, the conveying element can circulate continuously and, in this way, constantly convey the textile material.

Moreover, the conveying unit includes two side walls in order to hold the textile material in the conveying area in the transverse direction of the conveying element. With the aid of the side walls, for example, the textile material can be prevented from falling off the conveying element.

In addition, the conveying unit includes two sealing devices, each of which is arranged between one of the two side walls and the conveying element such that an interior space enclosed by the conveying element is sealed with respect to the textile material. Since the textile material can be made up of textile fibers, the textile fibers can accumulate in the surroundings and in the interior space. This can be prevented with the aid of the sealing device. By means of the sealing device, it can be ensured that the textile material and the textile fibers remain in the conveying area. Moreover, dust can build up during the conveyance of the textile material, wherein the dust is essentially made up of the textile material or is carried along by the textile material. With the aid of the sealing devices, the dust can also be prevented from entering the interior space of the conveying element.

Moreover, at least one sealing device has a sealing element connected to the conveying element, which extends away from the outer side of the conveying element such that it rises with respect to the conveying area and/or the support area. Since the sealing element is connected to the conveying element, it moves along with the conveying element. A relative motion between the conveying element and the sealing element is therefore avoided. In addition, a relative motion between the sealing element and the textile material is also avoided.

Consequently, the textile material is highly reliably prevented from entering the surroundings of the conveying area and the interior space. Since the sealing element extends away from the conveying element, these form a type of boundary. Since at least one sealing device has a sealing element, the conveying unit includes at least one sealing element.

Moreover, the at least one sealing device can include at least one sealing element. For example, the at least one sealing device can include multiple sealing elements, which, for example, are spaced apart from one another in the transverse direction.

It is advantageous when the at least one sealing element extends away from the conveying element and at least partially in the circumferential direction about the conveying element. As a result, the conveying area can be consistently sealed.

Advantageously, the conveying unit includes at least two deflection elements arranged in the interior space for supporting and deflecting the conveying element. The two deflection elements can be spaced apart from one another in a conveyance direction of the textile material. The deflection elements are, for example, deflection pulleys. Additionally or alternatively, the conveying unit can include a drive, by means of which the conveying element can be driven.

It is advantageous when the at least one sealing device includes a roof element associated with the adjacent side wall, which covers a free end of the sealing element. Therefore, the conveying unit also includes at least one roof element. In addition, the at least one roof element is associated with the at least one sealing element. With the aid of the at least one roof element, the textile material can be prevented from directly reaching the at least one sealing element. Moreover, the at least one sealing device can include at least one roof element associated with the adjacent side wall. The at least one sealing device can therefore also include multiple roof elements.

It is advantageous when the roof element extends in the transverse direction of the conveyor belt. The roof element can extend starting from the side wall and/or obliquely in the transverse direction of the conveying element. As a result thereof as well, the textile material is prevented from accumulating on the at least one sealing element and/or dropping onto the sealing element.

It is advantageous when the at least one roof element is associated with one side area of the conveying element, wherein the roof element projects over the sealing element toward the conveying area, in particular in the transverse direction. As a result, the textile material is prevented from dropping onto the at least one sealing element and/or entering the side area of the conveying element.

It is advantageous when the at least one roof element is arranged at the side wall. Consequently, the at least one roof element with the side wall forms a boundary.

It is advantageous when a free roof end of the at least one roof element is spaced apart from the sealing element, in particular in the transverse direction.

Additionally or alternatively, the roof element can also be arranged over the sealing element. As a result, the at least one roof element covers the sealing element. The free roof end is an eave, which projects over the sealing element such that the textile material cannot drop onto the sealing element.

It is advantageous when a shortest distance between the free roof end and the conveying element is less than a shortest distance between the free end of the sealing element and the conveying element. As a result, very little textile material can drop onto the sealing element.

It is advantageous when the at least one roof element includes a roof surface, which covers the at least one sealing element. The roof surface of the roof element can be slanted such that the textile material dropped onto the at least one roof element can slide in the direction of the conveying area. The roof surface can be flat, concave, and/or convex.

It is advantageous when the at least one sealing element is arranged in a side area of the conveying element. As a result, the conveying area, which is arranged between the sealing elements, can be designed to be as large as possible.

It is advantageous when the sealing elements extend perpendicularly away from the conveying element. Alternatively, the at least one sealing element can also extend away from the conveying element obliquely, in particular toward the conveying area or away from the conveying area. The at least one sealing element is therefore arranged slanting, for example, toward the conveying area or away from the conveying area. Additionally or alternatively, the at least one sealing element can also be designed to be trapezoidal and extending away from the sealing elements. Additionally or alternatively, the at least one sealing element can also have the shape of a parallelogram.

It is advantageous when the conveying unit has a housing including the side walls, in which at least the conveying element is arranged. By means of the housing, the textile material can also be delineated from the surroundings.

It is advantageous when the at least one roof element has at least one sealing surface facing the free end of the sealing element, which, together with the sealing element, seals the conveying area with respect to the interior space.

Additionally or alternatively, the at least one roof element can also have at least one sealing edge, which, together with the sealing element, seals the conveying area with respect to the interior space. The sealing edge can cover and/or project over the free end of the sealing element. In order to reach the interior space from the conveying area, the textile material must pass between the at least one roof element and the at least one sealing surface and/or the at least one sealing edge.

This is prevented due to the arrangement of the free end of the sealing element with respect to the sealing surface and/or with respect to the sealing edge.

It is advantageous when the at least one roof element has an inner mating surface, which faces an inner lateral surface of the sealing element, which faces the conveying area.

Additionally or alternatively, the at least one roof element can have an outer mating surface, which faces an outer lateral surface of the sealing element, which faces away from the conveying area. The seal can be improved by means of the inner and/or outer mating surface(s), because the textile material must pass between the associated surfaces in order to reach the interior space.

It is advantageous when the at least one sealing element has an inner mating element, wherein the inner mating element includes the inner mating surface.

Additionally or alternatively, the at least one sealing element can have an outer mating element, wherein the outer mating element has the outer mating surface.

The mating surface can be formed by means of the mating elements. Moreover, the mating elements form an obstacle for the textile material.

It is advantageous when the sealing surface, the inner mating surface, and/or the outer mating surface are arranged in a recess in at least one roof element. The recess can be formed in the at least one roof element in an easy way.

It is advantageous when the at least one sealing element and the at least one roof element form a labyrinth seal. The seal can be improved as a result. It is advantageous when the at least one sealing element and the at least one roof element are arranged without contact with one another, and so wear is avoided between the sealing elements moving with respect to the mating elements. Due to the labyrinth seal, the textile material must cover a meandering path to the interior space, which is thereby prevented, however.

It is advantageous when a gap is arranged between the at least one sealing element and the at least one roof element. As a result, the at least one sealing element and the at least one roof element can be moved without contact.

It is advantageous when the at least one sealing element and the at least one roof element are spaced apart from one another. As a result, the at least one sealing element can be moved with respect to the at least one roof element without contact.

It is advantageous when the at least one sealing element is at least partially, in particular completely, slotted from the direction of the free end. The at least one sealing element can be slotted in the transverse direction of the conveying element. Additionally or alternatively, the at least one sealing element can also be obliquely slotted. Since the at least one sealing element is arranged on the conveying element and/or is connected thereto, the at least one sealing element is also deflected in deflection areas and/or in the area of the deflection units. Due to the increased radius through which the at least one sealing element must pass, the sealing element can spread apart due to the slots in the area of the deflection without the at least one sealing element tearing due to the load during deflection. The slots in the at least one sealing element are advantageous, for example, for the case in which a height of the sealing element is greater than 8 mm.

It is advantageous when the at least one sealing element is designed to be elastic. As a result thereof as well, the at least one sealing element can stretch in the deflection area in order to pass through the deflection areas without damage.

It is advantageous when the at least one sealing element is designed to be undulating and/or fan-shaped. When the at least one sealing element stretches in the deflection area, the at least one sealing element can fan out, and so the at least one sealing element can pass through the deflection without load. Once the deflection area has been passed through, the undulating and/or fan-shaped sealing element gets pushed back together.

It is advantageous when the at least one sealing element is designed as one piece with the conveying element. Alternatively, the at least one sealing element can also be connected to the conveying element, in particular in a force-locked, form-locked, and/or integrally joined manner. For example, the at least one sealing element can be bonded or vulcanized onto the conveying element.

Moreover, the at least one sealing element can also be screwed onto the conveying element.

It is advantageous when the at least one sealing element has a height above the conveying element and/or the conveying area between 0.5 mm and 5 cm.

It is advantageous when the at least one sealing element is designed as a raised area and/or as a circumferential rib.

It is advantageous when the conveying element is arranged obliquely with respect to a horizontal direction. Consequently, textile material can also be conveyed across a height, i.e., upward or downward.

It is advantageous when the conveying element is a conveyor belt, a conveyor chain, and/or a link conveyor belt.

It is advantageous when each of the sealing devices has at least one sealing element. Additionally or alternatively, both sealing devices can also have at least one roof element. Although it is mainly described, in the description, that at least one sealing device has a sealing element and/or a roof element, it can be advantageous when each of the sealing devices has at least one sealing element and/or at least one roof element. The two sealing devices and the at least one sealing element and/or the at least one roof element can be designed, in principle, to be identical to one another. Alternatively, the at least one sealing element and/or the at least one roof element of the two sealing devices can also differ from one another when, for example, one of the two sealing devices is exposed to more textile material than the other sealing device.

It is advantageous when the conveying element includes processing elements for the textile material, in particular teeth for opening a textile bale. The conveying element can be, for example, a spiked lattice, which has the teeth or spikes in order to tear apart the textile material. With the aid of the conveying element, the textile material can be not only conveyed, but also processed. For example, the conveying unit can also be a bale opener. The textile material can be present namely in the form of a bale, which is ripped, i.e., opened, and conveyed by the passing conveying element, which has teeth or spikes.

BRIEF DESCRIPTION OF THE DRAWINGS

Further advantages of the invention are described in the following exemplary embodiments, wherein.

DETAILED DESCRIPTION

Figure 1:
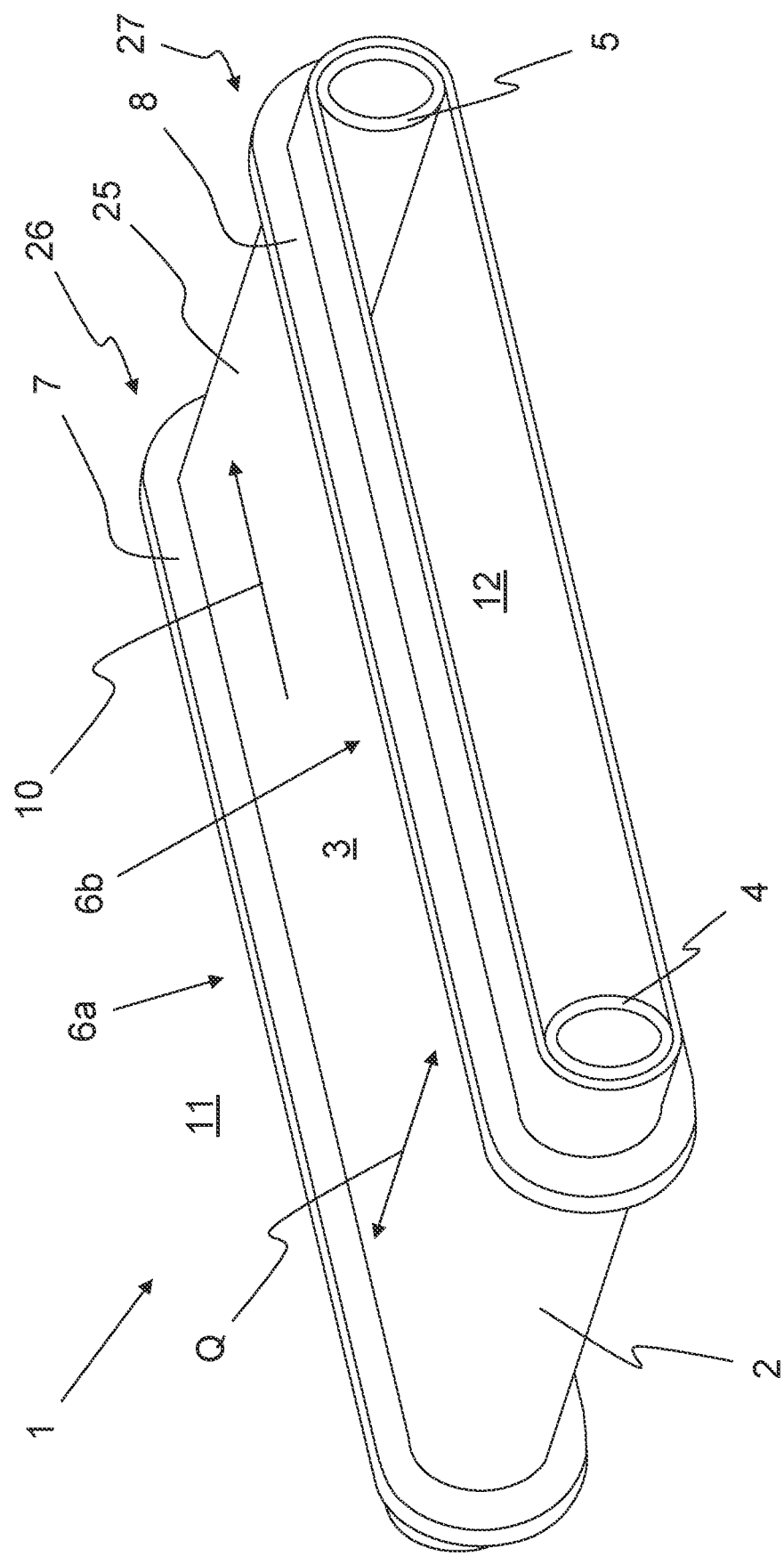
FIG. 1 shows a schematic view of a conveying unit.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 2:
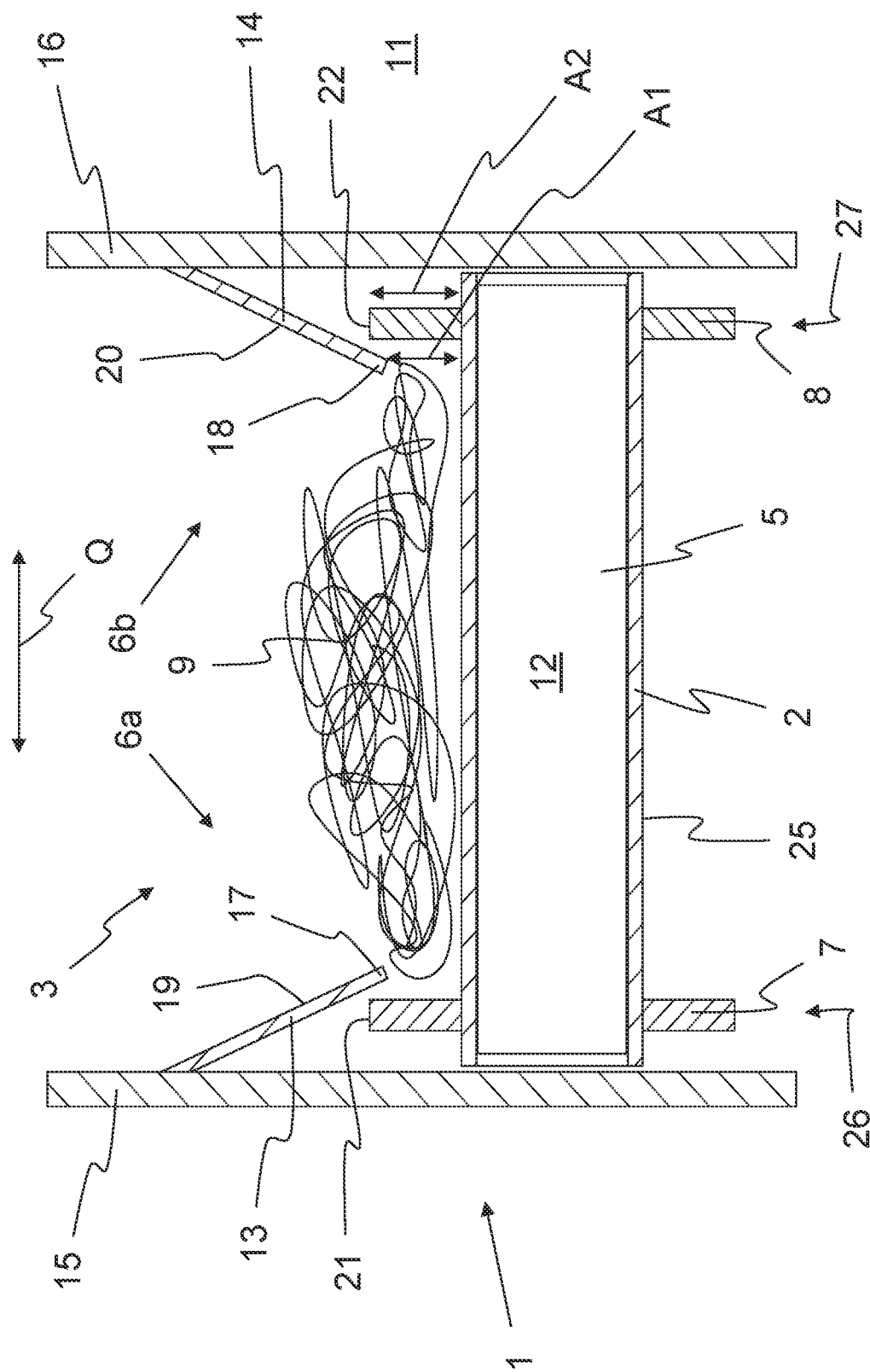
FIG. 2 shows a cross-section of the conveying unit 1 with two side walls 15, 16 and, arranged therebetween, a conveying element 2 and textile material 9.

FIG. 1 shows a schematic view of a conveying unit 1 for conveying textile material 9 (FIG. 2). The conveying unit 1 according to the present exemplary embodiment has the form of a conveyor belt. The textile material 9 can include textile fibers, which include, for example, natural, mineral, and/or synthetic fibers. The textile fibers can include, furthermore, short and/or long fibers. Moreover, dust can be carried along by the textile material 9 or dust forms during the conveyance of the textile material 9.

The conveying unit 1 includes an endlessly circulating and drivable conveying element 2, which has a conveying area 3 on an outer side 25, by means of which the textile material 9 can be conveyed. Additionally or alternatively, the conveying area 3 can also have a support area, on which the textile material 9 can rest. With the aid of the conveying element 2, the textile material 9 can be conveyed in a conveyance direction 10. The conveying element 2 is driven such that the textile material 9 is conveyed in the conveyance direction 10. Moreover, the conveying element 2 encloses an interior space 12.

According to the present exemplary embodiment, the conveying unit 1 also includes two deflection units 4, 5, by means of which the conveying element 2 is supported and deflected. Advantageously, at least one of the two deflection units 4, 5 shown here can be driven, for example, by means of a drive, in particular an electric motor, in order to drive the conveying unit 1. The deflection units 4, 5 and/or the drive (not shown here) are/is or can be arranged in the interior space 12.

Moreover, the conveying unit 1 includes two sealing devices 6a, 6b, by means of which the conveying area 3 can be sealed with respect to the interior space 12 and/or the surroundings 11. By means of the sealing devices 6a, 6b, the textile material 9 and/or the textile fibers or associated dust from the conveying area 3 can be prevented from entering the interior space 12 and/or the surroundings 11. At the least, the textile material 9 can be prevented from accumulating by means of the sealing devices 6a, 6b. The functional capability of the conveying unit 1 can be limited due to the accumulation of the textile material 9 in the area of the deflection units 4, 5 or the drive in the interior space 12. For example, increased friction can occur between moving parts or a cooling of the drive can be reduced. Moreover, the textile material 9 can wrap around the deflection units 4, 5 or the drive, which can result in damage.

At least one sealing device 6a, 6b includes at least one sealing element 7, 8, which extends away from the outer side 25 of the conveying element 2 such that it rises with respect to the conveying area 3. The at least one sealing element 7, 8 is connected to the conveying element 2 such that the at least one sealing element 7, 8 moves when the conveying element 2 moves. Moreover, the at least one sealing element 7, 8 rises from the outer side 25 above the conveying area 3.

The at least one sealing element 7, 8 is arranged in a side area 26, 27 of the conveying element 2. Moreover, the at least one sealing element 7, 8 extends away from the conveying element 2. In addition, the at least one sealing element 7, 8 extends at least partially in the circumferential direction about the conveying element 2.

According to the present exemplary embodiment, each of the sealing devices 6a, 6b includes a sealing element 7, 8, respectively, wherein one sealing element 7, 8 is arranged in one side area 26, 27, respectively.

FIG. 2 shows a cross-section of the conveying unit 1 with two side walls 15, 16 and, arranged therebetween, a conveying element 2 and textile material 9. The textile material 9 is shown as a ball in this case and in the following figures. As described above, the textile material 9 can also include textile fibers and/or dust.

Features that have already been described with reference to the at least one preceding figure are not explained once more, for the sake of simplicity. Moreover, features can also be described first in this figure or in at least one of the following figures. Moreover, identical reference characters are utilized for identical features for the sake of simplicity. In addition, for the sake of clarity, not all the features may be shown and/or labeled with a reference character in the following figures. Features shown in one or several of the preceding figures can also be present in this figure or in one or several of the following figures, however. Moreover, for the sake of clarity, features can also be shown and/or labeled with a reference character first in this figure or in one or several of the following figures. Nevertheless, features that are first shown in one or several of the following figures can also be already present in a preceding figure.

The two side walls 15, 16 are utilized for holding the textile material 9 in the conveying area 3 in the transverse direction Q of the conveying element 2. When the conveying element 2 conveys the textile material 9, the conveying element 2 moves with respect to the fixed side walls 15, 16. The two side walls 15, 16 form a boundary with respect to the surroundings 11, since the textile material 9 can tend to form fiber fly.

The two sealing devices 6a, 6b are shown here once more, wherein at least one sealing device 6a, 6b includes the at least one sealing element 7, 8. According to the present exemplary embodiment, each of the sealing devices 6a, 6b includes at least one sealing element 7, 8. In this case, each sealing device 6a, 6b includes one sealing element 7, 8. The interior space 12 can be sealed on both sides with the aid of the two sealing elements 7, 8.

According to the present exemplary embodiment, at least one sealing device 6a, 6b includes at least one roof element 13, 14. In this case, each of the sealing elements 6a, 6b includes at least one roof element 13, 14. In this case, each sealing device 6a, 6b includes one roof element 13, 14.

The at least one roof element 13, 14 is arranged at the associated side wall 15, 16. Consequently, the at least one roof element 13, 14 is fixed to the associated side wall 15, 16 or is fixed against the associated side wall 15, 16. Moreover, the conveying element 2 moves with respect to the at least one roof element 13, 14 when the conveying element 2 conveys the textile material 9.

The at least one roof element 13, 14 covers a free end 21, 22 of the at least one sealing element 7, 8. As a result, the textile material 9 that is dropped onto the conveying area 3 can be prevented from reaching the at least one sealing element 7, 8. Consequently, it is made difficult for the textile material 9 to enter the interior space 12.

As shown here, the at least one roof element 13, 14 is arranged sloping in the direction of the conveying area 3, and so the dropped textile material 9 can slide over the at least one roof element 13, 14 in the direction of the conveying area 3. The two roof elements 13, 14 shown here form a type of funnel.

The at least one roof element 13, 14 also includes at least one roof surface 19, 20, over which the textile material 9 can slide to the conveying area 3. The at least one roof surface 19, 20 can be, for example, coated, in order to reduce a friction of the textile material 9 during sliding.

Moreover, the at least one roof element 13, 14 includes a free roof end 17, 18, which is spaced apart from the free end 21, 22 of the associated sealing element 7, 8 in the transverse direction Q. The at least one free roof end 17, 18 in this case is closer to the conveying area 3 than the associated free end 21, 22 of the sealing element 7, 8. The at least one roof element 13, 14 therefore projects over the at least one sealing element 7, 8, and so the textile material 9 cannot easily enter the interior space 12. The free roof end 17, 18 of the at least one roof element 13, 14 therefore also forms a roof edge, a sealing edge, or an eave, which covers and/or projects over the at least one sealing element 7, 8. The textile material 9 therefore slides over the free roof end 17, 28 or the roof edge, the sealing edge, or the eave onto the conveying area 3.

Moreover, the at least one free roof end 17, 18 has a first shortest distance A1 to the conveying element 2 and to the outer side 25. In addition, the at least one free end 21, 22 of the at least one sealing element 7, 8, has a second shortest distance A2 to the conveying element 2 and to the outer side 25. It is advantageous when the first distance A1 is shorter than the second distance A2, since the seal is improved as a result.

Figure 3:
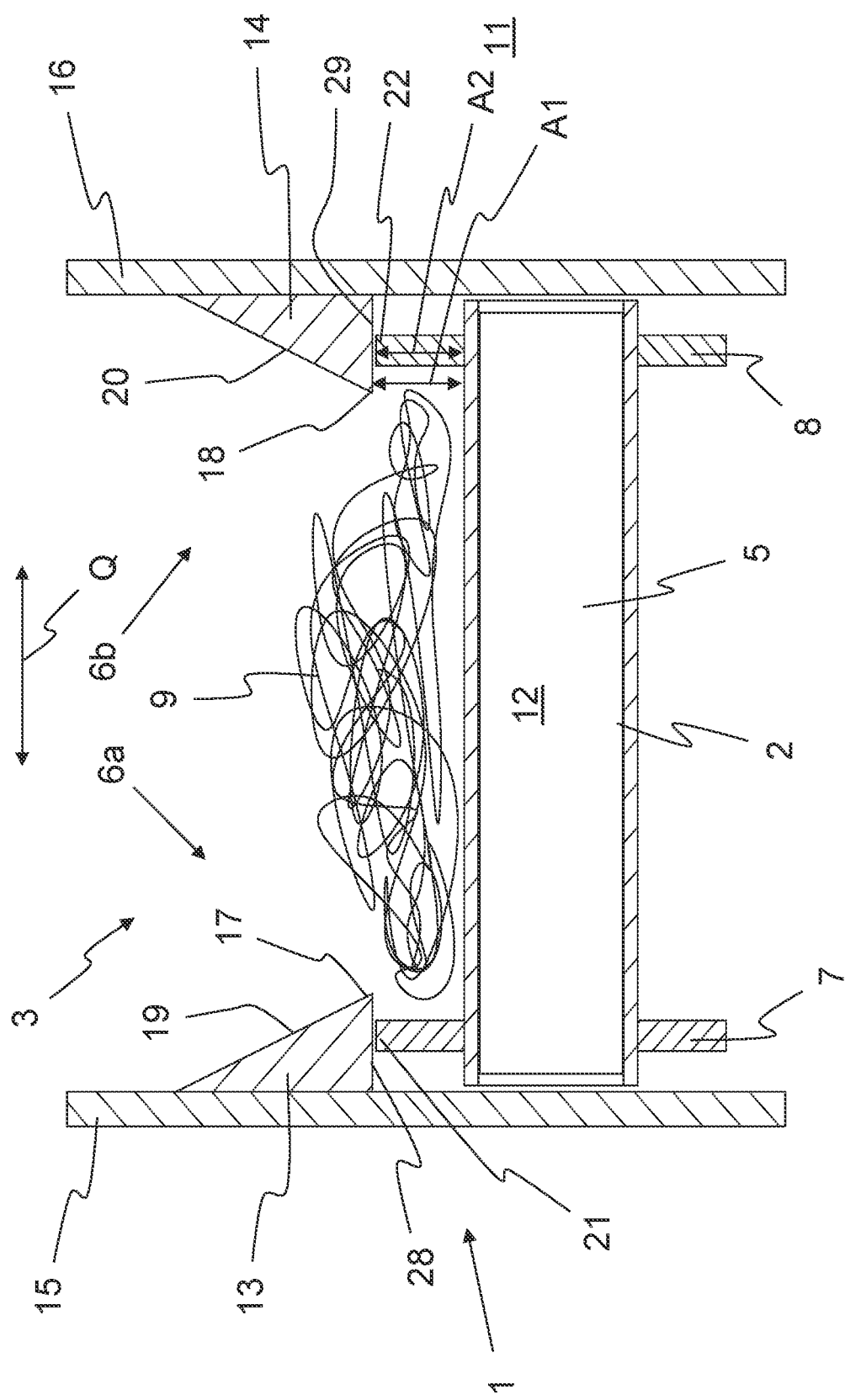
FIG. 3 shows an exemplary embodiment with at least one sealing element and at least one roof element.

FIG. 3 shows one further embodiment of the at least one roof element 13, 14. The at least one roof element 13, 14 has at least one sealing surface 28, 29, which is situated opposite or facing the free end 21, 22 of the sealing element 7, 8. The at least one sealing surface 28, 29 and the free end 21, 22 of the sealing element 7, 8, together, form a seal, and so the interior space 12 is better sealed with respect to the conveying area 3. As is apparent here, furthermore, the at least one sealing surface 28, 29 or the at least one roof element 13, 14 and the free end 21, 22 of the sealing element 7, 8 are spaced apart from one another such that the at least one sealing element 7, 8 can be moved freely with respect to the at least one roof element 13, 14.

Figure 6:
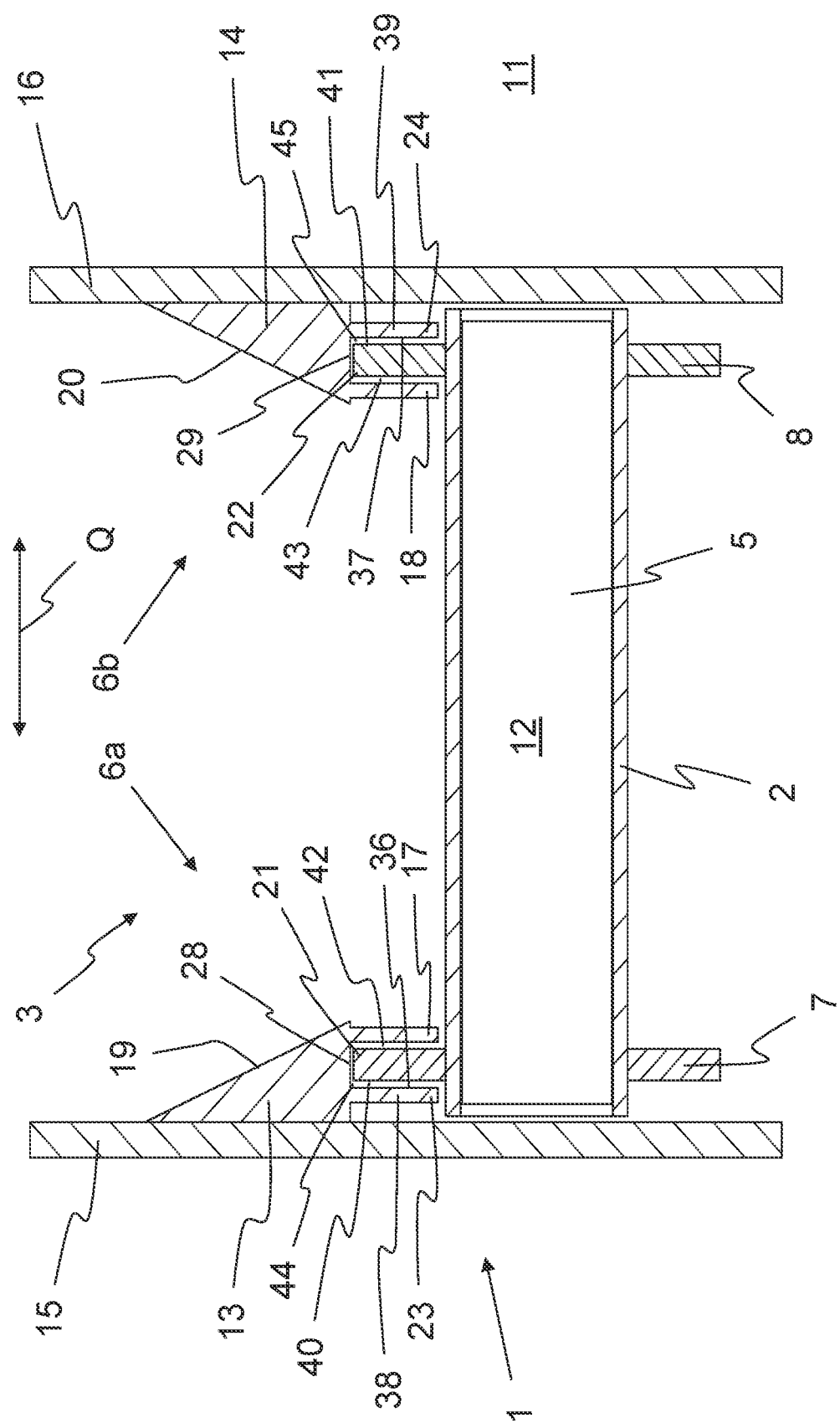
FIG. 6 shows an exemplary embodiment with at least one sealing element and at least one roof element.

Moreover, the two distances A1, A2 are shown here. The first distance A1 is at least equal in size to the distance A2 in this case. When a gap 42, 43, which is shown in FIG. 6, is arranged between the at least one sealing element 7, 8 and the associated at least one roof element 13, 14, the first distance A1 is greater than the distance A2, namely, for example, by a size of the gap 42, 43.

Figure 4:
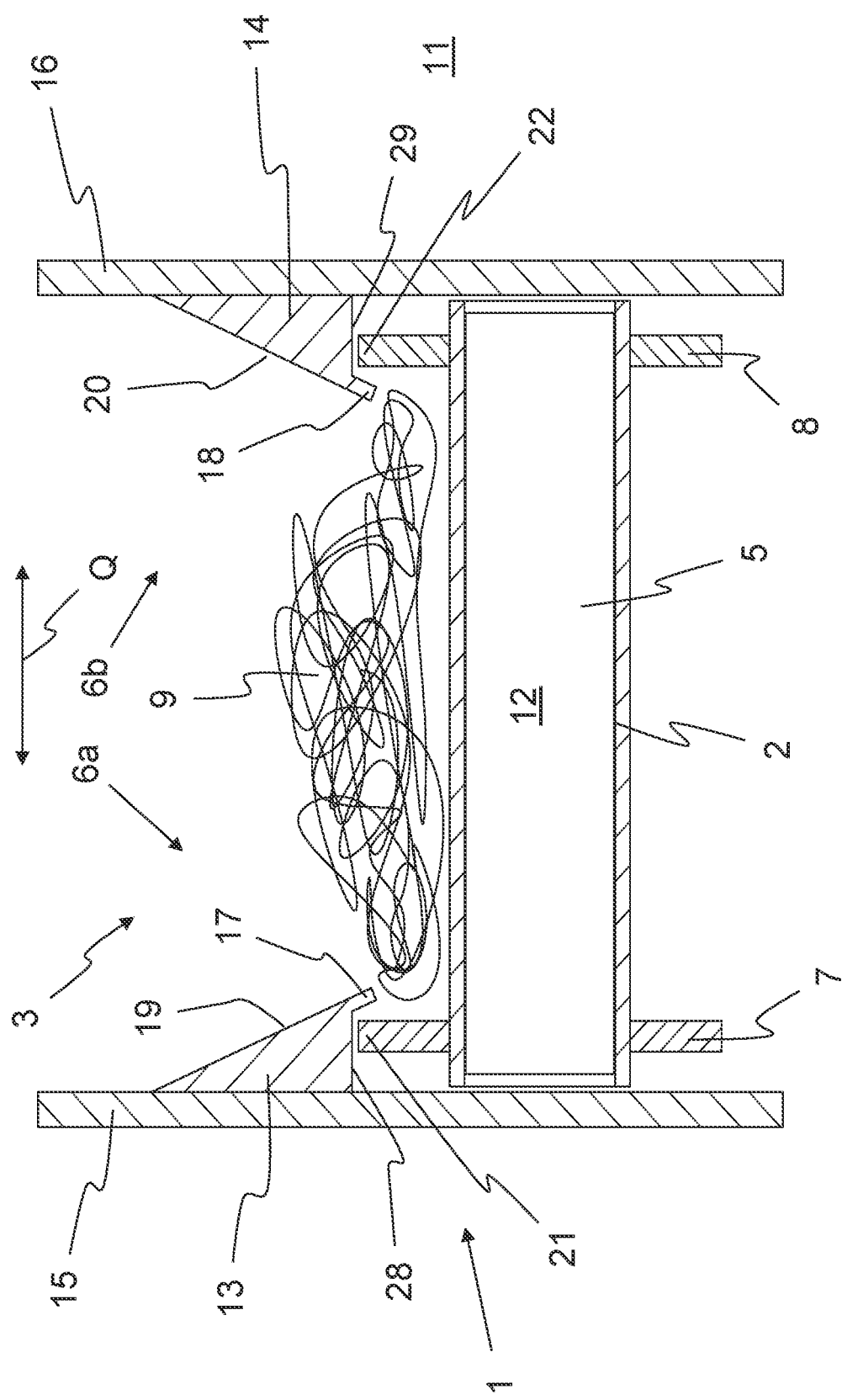
FIG. 4 shows an exemplary embodiment with at least one sealing element and at least one roof element.

FIG. 4 shows one further exemplary embodiment of the conveying unit 1. In this case, the free roof end 17, 18 of the at least one roof element 13, 14, protrudes beyond the sealing surface 28, 29 and beyond the free end 21, 22 of the sealing element 7, 8. Consequently, the seal is improved.

Figure 5:
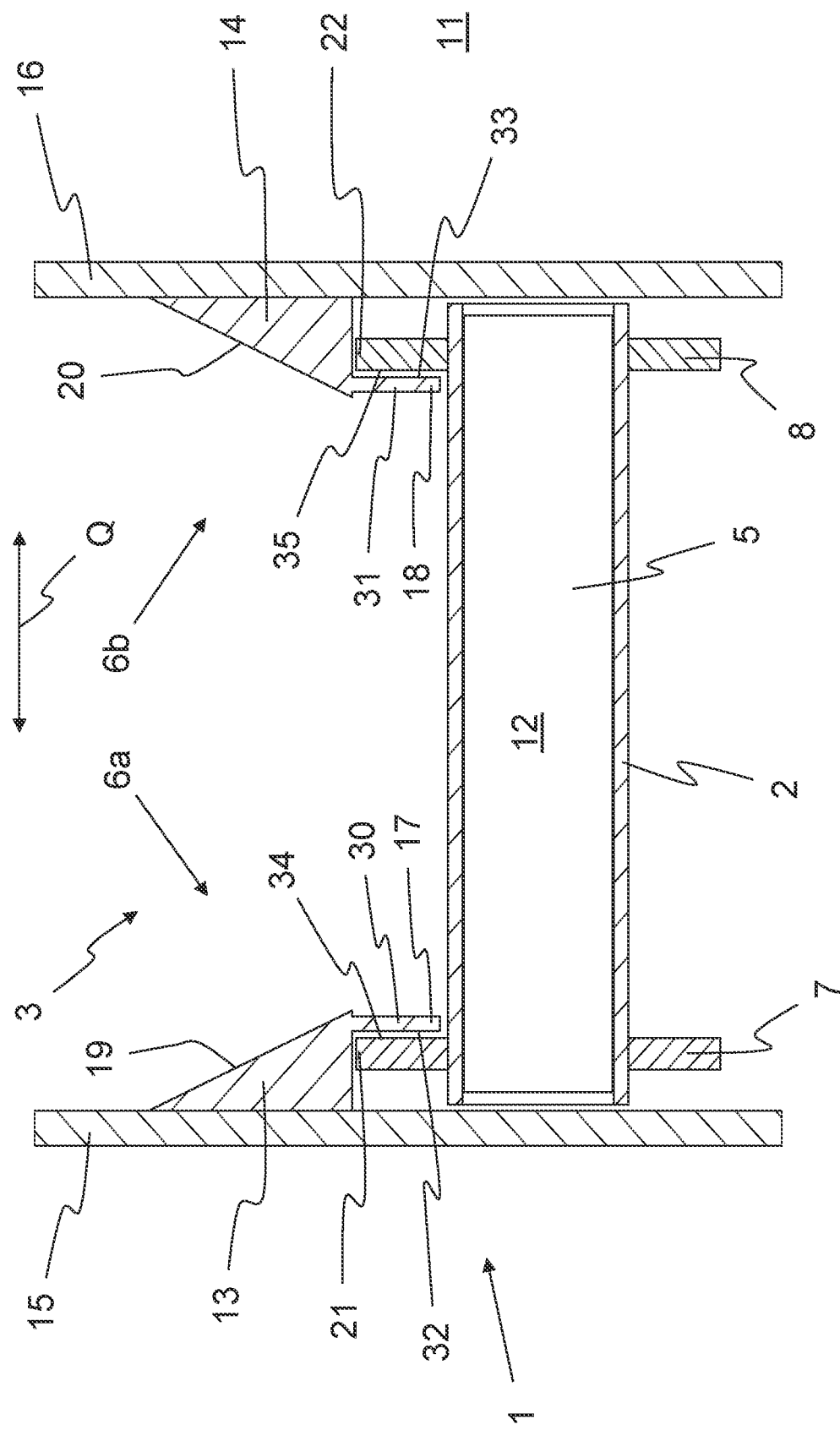
FIG. 5 shows an exemplary embodiment with at least one sealing element and at least one roof element.

FIG. 5 shows one further exemplary embodiment of the conveying unit 1 with at least one roof element 13, 14, which includes at least one mating element 30, 31. The textile material 9 is no longer shown from this point forward for the sake of clarity.

The at least one sealing element 7, 8 has an inner lateral surface 34, 35. The inner lateral surface 34, 35 is arranged opposite an inner mating surface 32, 33. The seal can be improved by means of the inner lateral surface 34, 35 and the inner mating surface 32, 33. In order to enter the interior space 12 from the conveying area 3, the textile material 9 must pass between the inner lateral surface 34, 35 and the inner mating surface 32, 33 and over the at least one sealing element 7, 8.

In this case, the inner mating element 30, 31 has the inner mating surface 32, 33, wherein the inner mating element 30, 31 is arranged at the at least one roof element 13, 14 and/or is formed by means of the at least one roof element 13, 14. Moreover, the free end 21, 22 is arranged at the inner mating element 30, 31.

FIG. 6 shows one further exemplary embodiment of a conveying unit 1. The at least one roof element 13, 14 has at least one outer mating surface 36, 37 in this case, additionally or alternatively to the inner mating surface 32, 33 and/or to the inner mating element 30, 31. The inner mating surface 32, 33 and/or the inner mating element 30, 31 are no longer provided with a reference character in this case.

The at least one outer mating surface 36, 37 is arranged opposite or facing an outer lateral surface 40, 41. The at least one outer mating surface 36, 37 and the associated outer lateral surface 40, 41, together, also form a seal such that the textile material 3 cannot pass between the at least one outer mating surface 36, 37 and the associated outer lateral surface 40, 41. According to FIG. 6 and also according to at least one of the preceding figures, the at least one sealing element 7, 8 and the at least one mating element 30, 31, 38, 39, with the associated surfaces 28, 29, 32-37, 40, 41, form a labyrinth seal such that the textile material 3 can hardly enter the interior space 12.

Moreover, the at least one mating element 30, 31, 38, 39 can be formed, for example, as one piece with the at least one roof element 13, 14. For example, the at least one mating element 30, 31, 38, 39 and/or the surfaces 28, 29, 32-37, 40, 41 can be formed by means of a recess 44, 45 in the at least one roof element.

Moreover, according to this FIG. 6, the at least one outer mating element 38, 39 also has a free roof end 23, 24. The free roof end 23, 24 of the at least one outer mating element 38, 39 is also arranged closer to the conveying unit 2 than the free end 21, 22 of the sealing element 7, 8.

Moreover, a gap 42, 43 is arranged between the at least one sealing element 7, 8 and the at least one roof element 13, 14. With the aid of the gap 42, 43, the at least one sealing element 7, 8 is spaced apart from the at least one roof element 13, 14 such that the at least one sealing element 7, 8 connected to the conveying element 2 can move freely with respect to the at least one roof element 13, 14. Wear is prevented as a result.

Although the preceding figures are mostly described in such a way that at least one sealing element 7, 8 and/or at least one roof element 13, 14 are/is present, it is advantageous when at least two sealing elements 7, 8 and/or at least two roof elements 13, 14 are present, as shown in the figures. Even though this was not also discussed, the free ends 21, 22 of the two sealing elements 7, 8 are referred to as a first and a second free end 21, 22. The further features of the sealing elements 7, 8 and/or of the roof elements 13, 14 are also referred to as "first" and "second". Moreover, the two sealing devices 6a, 6b are designed to be identical and mirror symmetrical to one another in the figures. Alternatively, however, one of the two sealing devices 6a, 6b can also be designed differently, however, when, for example, one of the two sealing devices 6a, 6b is exposed to more textile material 9.

Figure 7:
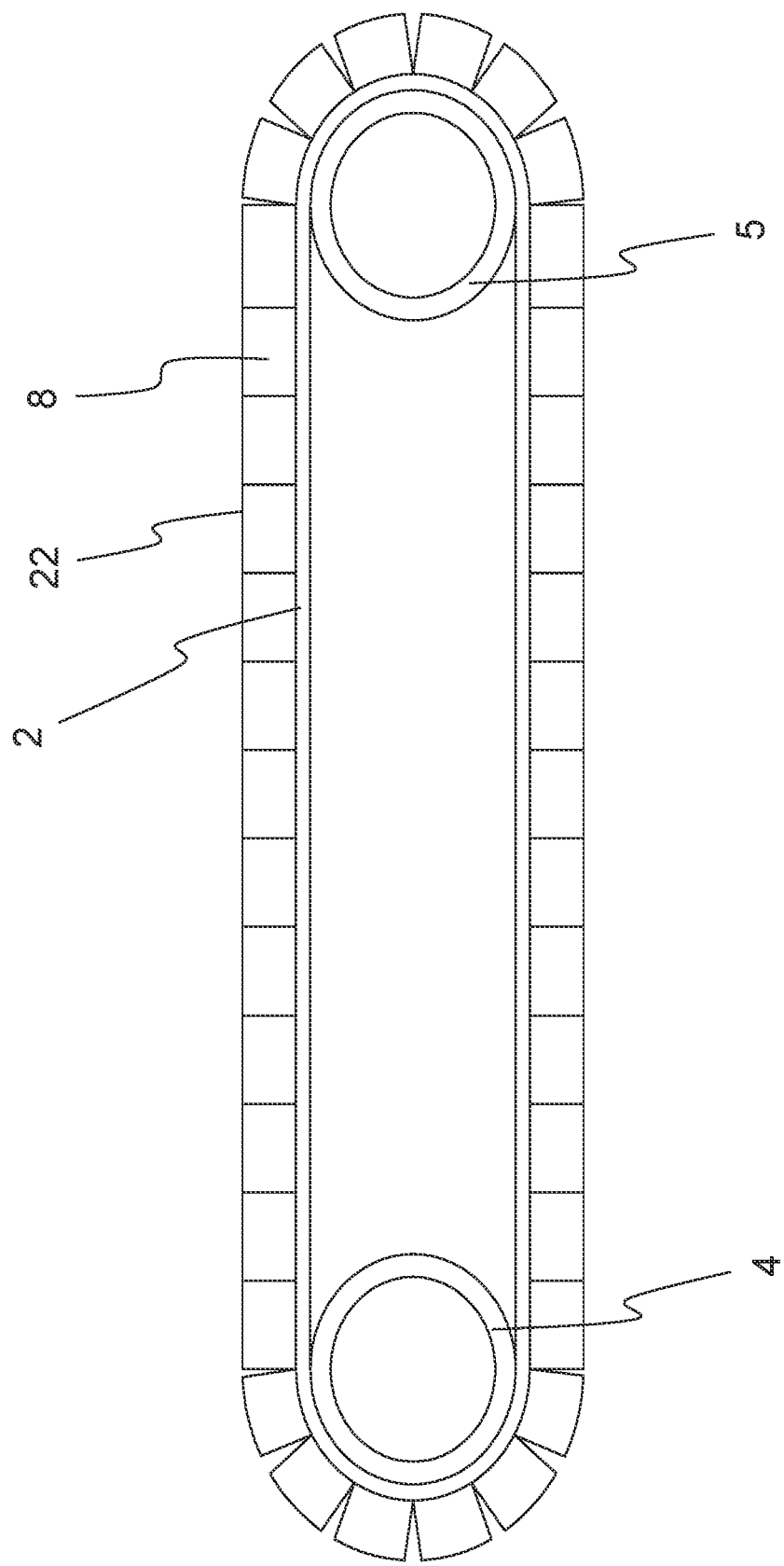
FIG. 7 shows a side view of the conveying element with a slotted sealing element.

FIG. 7 shows a side view of the conveying element 2 with a slotted sealing element 8. Advantageously, both sealing elements 7, 8 are slotted. Since the sealing element 8 must pass through a larger radius than the conveying element 2 upon deflection by the deflection units 4, 5, the sealing element 8 is stretched upon deflection. The higher the sealing element 8 extends above the conveying element 2, the greater is the stretch. In order to prevent the at least one sealing element 8 from tearing, it is at least partially slotted starting from the free end 22 such that the at least one sealing element 8 can spread apart upon deflection. According to the present exemplary embodiment, the sealing element 8 is slotted completely, i.e., up to the conveying element 2.

Figure 8:
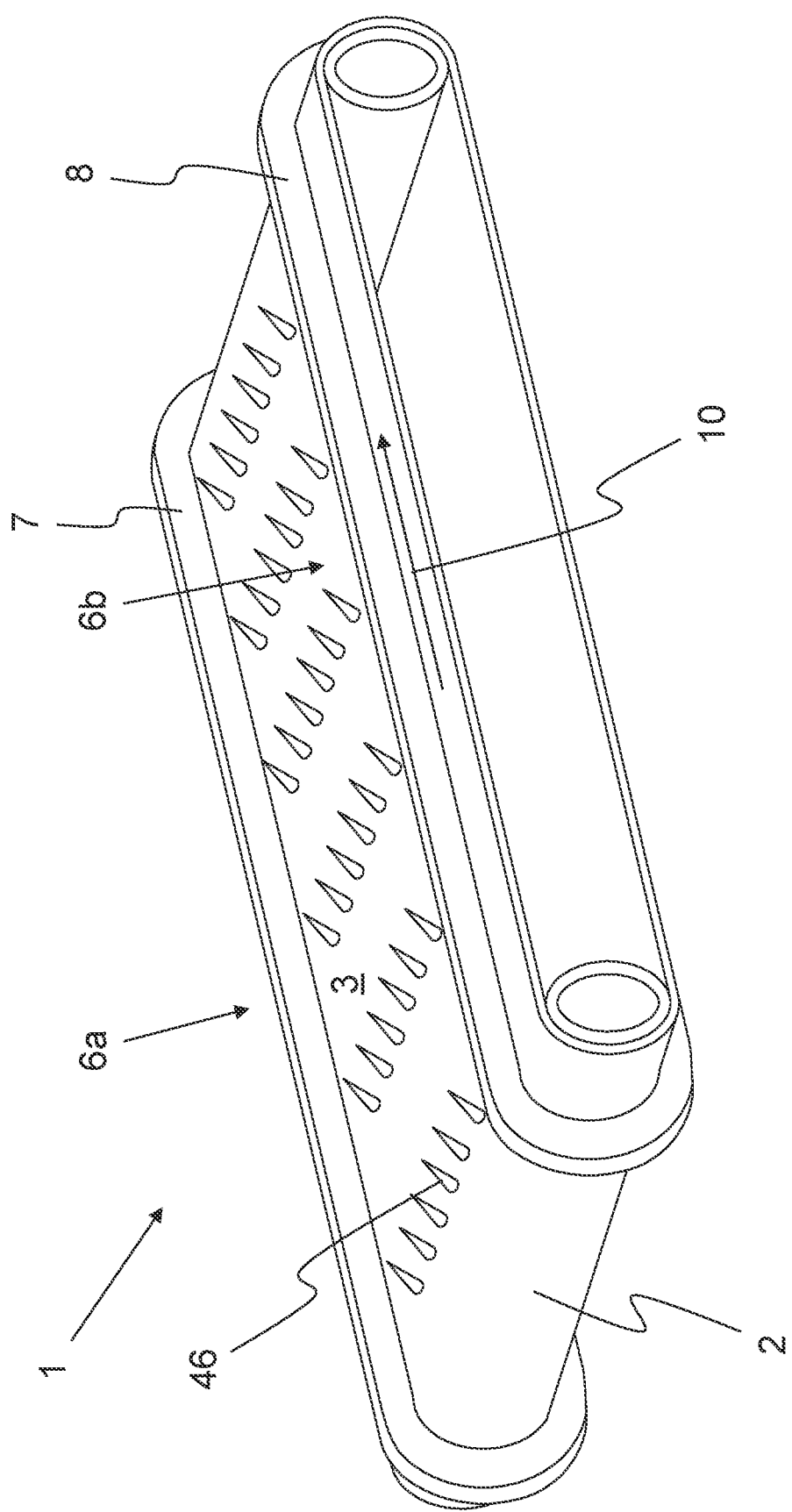
FIG. 8 shows a perspective view of the conveying element as a spiked lattice.

FIG. 8 shows one exemplary embodiment of the conveying element 2, which is designed as a spiked lattice in this case. The conveying element 2 has a plurality of teeth 46, which are arranged in the conveying area 3. The teeth 46 can also be spikes or referred to as spikes. The teeth 46 are connected to the conveying element 2. For example, the teeth 46 can be arranged directly at the conveying element 2 or the teeth 46 can be arranged at strips (not shown here), which are arranged at the conveying element 2 and/or are connected to the conveying element 2. Moreover, the teeth 46 are arranged obliquely toward the conveying direction 10. With the aid of the spiked lattice and with the aid of the teeth 46, a textile bale (not shown here), into which the textile material 9 is pressed, can be opened. The teeth 46 tear the textile material 9 apart. With the aid of the teeth 46, in addition, the textile material 9 can be transported across a height, i.e., upward or downward, since the teeth 46 fixedly hold the textile material 9 from sliding downward.

The present invention is not limited to the represented and described exemplary embodiments. Modifications within the scope of the claims are also possible, as is any combination of the features, even if they are represented and described in different exemplary embodiments.

LIST OF REFERENCE CHARACTERS 1 conveying unit
2 conveying element
3 conveying area
4 first deflection unit
5 second deflection unit
6 sealing device
7 first sealing element
8 second sealing element
9 textile material
10 conveyance direction
11 surroundings
12 interior space
13 first roof element
14 second roof element
15 first side wall
16 second side wall
17 first free roof end
18 second free roof end
19 first roof surface
20 second roof surface
21 first free end
22 second free end
23 third free roof end
24 fourth free roof end
25 outer side
26 first side area
27 second side area
28 first sealing surface
29 second sealing surface
30 first inner mating element
31 second inner mating element
32 first inner mating surface
33 second inner mating surface
34 first inner lateral face 35 second inner lateral face
36 first outer mating surface
37 second outer mating surface
38 first outer mating element
39 second outer mating element
40 first outer lateral face
41 second outer lateral face
42 first gap
43 second gap
44 first recess
45 second recess
46 teeth
Q transverse direction
A1 first distance
A2 second distance

The invention claimed is:

1. A conveying unit of a textile machine for conveying textile material, comprising:
- an endless circulating and drivable conveying element, the conveying element comprising a conveying area on an outer side thereof configured to receive and convey the textile material, the conveying element enclosing an interior space;
- opposite side walls disposed to hold the textile material in the conveying area of the conveying element in a transverse direction of the conveying element;
- a sealing device arranged between each side wall and the conveying element such that the interior space enclosed by the conveying element is at least partially sealed with respect to the textile material;
- the sealing devices comprising a sealing element connected to the conveying element so as to extend transversely away from and above the outer side of the conveying element;
- the sealing elements extending continuously around the conveying element with a constant height;
- a roof element configured with each side wall, the roof element comprising a sloped surface extending from the side wall with a continuous constant gap defined between a free end of the sealing element and the sloped surface.

2. The conveying unit of claim 1, further comprising at least two deflecting elements arranged in the interior space that support and deflect the conveying element in a conveying direction thereof.

3. The conveying unit of claim 1, wherein the roof element extends from the side wall in the transverse direction of the conveying element.

4. The conveying unit of claim 3, wherein the roof element protrudes over and beyond the sealing element towards the conveying area.

5. The conveying unit of claim 1, wherein the roof element comprises a free end spaced at a constant distance from the sealing element in the transverse direction.

6. The conveying unit of claim 5, wherein a shortest distance (A1) between the free end of the roof element and the conveying element is less than a shortest distance (A2) between the free end of the sealing element and the conveying element.

7. The conveying unit of claim 1, wherein the roof element comprises a sealing surface facing and spaced from the free end of the sealing element to seal the conveying area with respect to the interior space.

8. The conveying unit of claim 1, wherein the roof element comprises an inner mating surface opposite and facing a lateral face of the sealing element that faces the conveying area.

9. The conveying unit of claim 8, where the roof element further comprises an outer mating surface opposite and facing a lateral face of the sealing element that faces away from the conveying area.

10. The conveying unit of claim 9, wherein the sealing element extends into a recess of the roof element defined by the inner and outer mating surfaces.

11. The conveying unit of claim 1, wherein the roof element and the sealing element define a labyrinth seal therebetween.

12. The conveying unit of claim 1, wherein the sealing element is at least partially slotted from a free end thereof towards the conveying area.

13. The conveying unit of claim 1, wherein sealing element is elastic.

14. The conveying unit of claim 1, wherein the sealing element is connected to the conveying element or is formed integral with the conveying element.

15. The conveying unit of claim 14, wherein the sealing element formed as a raised rib of the conveying element.

16. The conveying unit of claim 1, wherein the conveying element is one of a conveyor belt, a conveyor chain, or a link conveyor belt.

17. The conveying unit of claim 1, wherein the conveying element further comprises processing elements on the outer surface thereof for opening the textile material, the processing elements comprising individual teeth or spikes arranged in a lattice pattern in the conveying area.

* * * * *